United States Patent [19]

Demmer

[11] 4,410,675
[45] Oct. 18, 1983

[54] RESINOUS SALTS, THEIR PREPARATIONS, AND THEIR USE IN COATINGS

[75] Inventor: Christopher G. Demmer, Cambridge, England

[73] Assignee: Ciba-Geigy Corporation, Ardsley, N.Y.

[21] Appl. No.: 449,954

[22] Filed: Dec. 15, 1982

[51] Int. Cl.$^3$ .................. C08G 59/06; C08G 59/14; C08G 59/16

[52] U.S. Cl. ................................. 525/533; 428/460; 525/523; 528/107; 528/109; 528/158

[58] Field of Search .............. 525/523, 533; 528/107, 528/109, 158

[56] References Cited

U.S. PATENT DOCUMENTS

| | | | |
|---|---|---|---|
| 3,301,831 | 1/1967 | Orthner et al. | 528/107 X |
| 3,374,287 | 3/1968 | Greenlee | 528/109 X |
| 3,852,240 | 12/1974 | Smith | 528/107 |
| 4,001,155 | 1/1977 | Kempter et al. | 525/523 X |
| 4,020,030 | 4/1977 | Harris et al. | 525/533 X |
| 4,029,621 | 6/1977 | Hartman et al. | 525/533 X |
| 4,153,586 | 5/1979 | Hockswender et al. | 525/533 X |
| 4,299,747 | 11/1981 | Birkmeyer | 525/533 X |
| 4,362,853 | 12/1982 | Demmer | 525/533 |

FOREIGN PATENT DOCUMENTS

1254528 11/1971 United Kingdom.

OTHER PUBLICATIONS

J. Org. Chem. 1945, 10, 470–478, Suter et al.

*Primary Examiner*—Howard E. Schain
*Attorney, Agent, or Firm*—Luther A. R. Hall

[57] ABSTRACT

Resinous salts, prepared by thioalkylation or sulfoalkylation of a phenol obtained by advancement of a polyepoxide, followed by at least partial neutralization, have the general formula

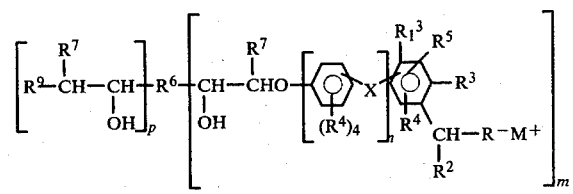

where $R^-$ represents a group of formula $—S—R^1—COO^-$ or a group of formula $—SO_3^-$; $R^1$ represents an aliphatic, aromatic or araliphatic divalent group which may contain a further group $—COO^-M^+$; $R^2$ represents $—H$ or alkyl; one of $R^3$ and $R_1^3$ represents a hydroxyl group and the other represents $—H$, halogen, alkyl, or alkenyl; each $R^4$ represents $—H$, halogen, alkyl, or alkenyl; $R^5$ represents $—H$, halogen, alkyl, alkenyl, or a group $—CH(R^2)OH$, $—CH(R^2)OR^8$, or $—CHR^2—R^-M^+$; $R^6$ represents the residue of a polyepoxide, preferably of average mol. wt. 1000–5000; each of the groups $R^7$, which may be the same or different, represents $—H$ or a covalent bond linked to the group $R^6$; $R^8$ represents alkyl or alkoxyalkyl; $R^9$ denotes the residue of an optional terminating group; m represents 1, 2, 3, or 4; n and p represent zero or 1, X represents alkylene, carbonyl, sulfonyl, oxygen, sulfur, or a valence bond; and $M^+$ represents a hydrogen ion or a cation derived from an alkali metal, ammonia, an amine or one valence of a polyvalent cation, at least 25% of the ions being a said cation.

Composition comprising these salts and, if required, a phenoplast, an aminoplast, or a blocked polyisocyanate, are stable when dispersed in water, usually with the aid of a minor amount of an organic solvent, and may be used to form protective films, especially for metal containers.

11 Claims, No Drawings

RESINOUS SALTS, THEIR PREPARATIONS, AND THEIR USE IN COATINGS

BACKGROUND OF THE INVENTION

This invention relates to new, water-soluble or water-dispersible resinous salts, to aqueous compositions containing them, and to surfaces coated with such compositions.

To obtain a corrosion-resistant coating for metal containers it is conventional to coat the metal surface with a crosslinkable resin formulation dissolved in an organic solvent and then to heat the coating to evaporate the solvent and to crosslink the resin. Crosslinking the coating converts it into a tough, adherent, flexible, and protective film. During heating, the solvent is usually evaporated into the atmosphere. Since organic solvents are relatively expensive, inflammable, and usually environmentally objectionable, there exists a need for coatings which may be applied using minimal proportions of such solvents, particularly useful being coating compositions which contain a high proportion of water.

We have now found that stable, aqueous compositions which cure to give coatings having excellent mechanical properties and chemical resistance may be prepared from new resinous salts. These salts are prepared from a phenol-terminated resin, either by thioalkylation with a mercaptocarboxylic acid and an aldehyde followed by at least partial neutralisation of the carboxylic acid group(s) introduced by the mercaptocarboxylic acid, or by sulphoalkylation with sulphurous acid (or a water-soluble salt thereof) and an aldehyde followed, if necessary, by at least partial neutralisation of the sulphonic acid group(s) introduced by sulphurous acid or its salt. They may be used with an aminoplast, a phenol-formaldehyde resin, or a blocked polyisocyanate as aqueous surface coating compositions. In certain circumstances the addition of such a coreactant is not, however, necessary.

The use of various reactions to obtain from phenols or epoxides water-soluble or water-dispersible resins for use as coatings has previously been described.

For example, British Pat. No. 1,254,528 discloses carboxyl group-containing polyethers said to be suitable for use in water-dilutable coating compositions and which are obtained by reaction of a glycidyl ether, a phenol-aldehyde condensate containing methylol groups, and a hydroxycarboxylic acid. The product is a polyether phenol-aldehyde resin etherified with the hydroxycarboxylic acid. Use of a mercaptocarboxylic acid to give a thioether-carboxylic acid is not envisaged. U.S. Pat. No. 4,153,586 describes producing a water-dispersible resin by reaction of a polyepoxide with a mercaptocarboxylic acid in the presence of a tin-containing catalyst.

Reaction between a phenol, an aldehyde, and an alkali metal bisulphite is also known (see, for example, Suter et al., J. Org. Chem., 1945, 10, 470–478) but, so far as we are aware, has not been carried out hitherto using a phenol-tipped advanced polyepoxide.

SUMMARY OF THE INVENTION

This invention accordingly provides new, water-soluble or water-dispersible resinous salts of formula

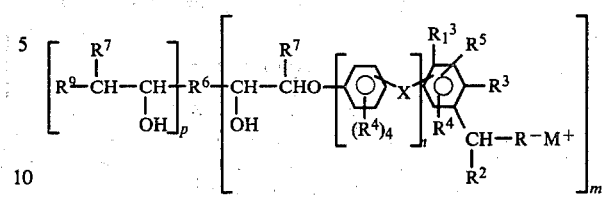

where
$R^-$ represents either a group of formula $$-S-R^1-COO^- \qquad \text{II}$$

or a group of formula $$-SO_3^- \qquad \text{III}$$

wherein $R^1$ represents an aliphatic, aromatic, or araliphatic divalent group of 1 to 10 carbon atoms which may contain a further group of formula $-COO^-M^+$, $R^2$ represents a hydrogen atom or an alkyl group of 1 to 4 carbon atoms, one of $R^3$ and $R_1^3$ represents a hydroxyl group and the other represents a hydrogen atom, a halogen atom, an alkyl group of 1 to 4 carbon atoms, or an alkenyl group of 2 to 4 carbon atoms, each $R^4$, which may be the same or different, represents a hydrogen atom, a halogen atom, an alkyl group of 1 to 4 carbon atoms, or an alkenyl group of 2 to 4 carbon atoms, $R^5$ represents an atom or a group bonded to a ring carbon atom which is ortho or para to the group $R^3$ or $R_1^3$ that represents a hydroxyl group, and is a hydrogen atom, a halogen atom, an alkyl group of 1 to 4 carbon atoms, an alkenyl group of 2 to 4 carbon atoms, a group of formula $-CH(R^2)OH$, a group of formula $-CH(R^2)OR^8$, or a group of formula

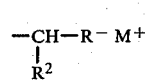

$R^6$ represents the residue of a polyepoxide after removal of $(m+p)$ 1,2-epoxide groups, each of the substituents $R^7$, which may be the same or different, represents either a hydrogen atom or a covalent bond linked to the group $R^6$ to form a cycloaliphatic ring which may be substituted by one or more aliphatic, cycloaliphatic, and/or heterocyclic groups, $R^8$ represents either an alkyl group of from 1 to 6 carbon atoms or an alkoxyalkyl group wherein the alkoxy group and the alkyl group each have from 1 to 6 carbon atoms, $R^9$ represents the residue of a monohydric phenol, a secondary monoamine, or a monocarboxylic acid after removal of the hydrogen atom of the phenolic hydroxyl group, the carboxylic acid group, or the secondary amino group, m represents 1, 2, 3, or 4, n represents zero or 1, p represents zero or 1, such that $(m+p)$ is at least 2 and at most 4, X represents an alkylene or alkylidene group of 1 to 3 carbon atoms, a carbonyl or sulphonyl group, an oxygen or sulphur atom, or a valency bond, and $M^+$ represents a hydrogen ion, a cation derived from an alkali metal, ammonia, or an amine, including quaternary ammonium cations, or one valency of a polyvalent cation, with the proviso that at least 25% of the ions $M^+$ are a said cation.

DETAILED DISCLOSURE

Preferred salts of formula I are those wherein, when $R^-$ represents a group of formula II, $R^1$ represents an alkylene group of 1 or 2 carbon atoms, those wherein $R^6$ represents a residue having an average molecular weight of from 1000 to 5000, and those wherein (m+p) represents 2. Chlorine and bromine are the preferred halogen atoms within the definitions of $R^3$, $R_1{}^3$, $R^4$, and $R^5$.

Preferably the salts of formula I are further of formula

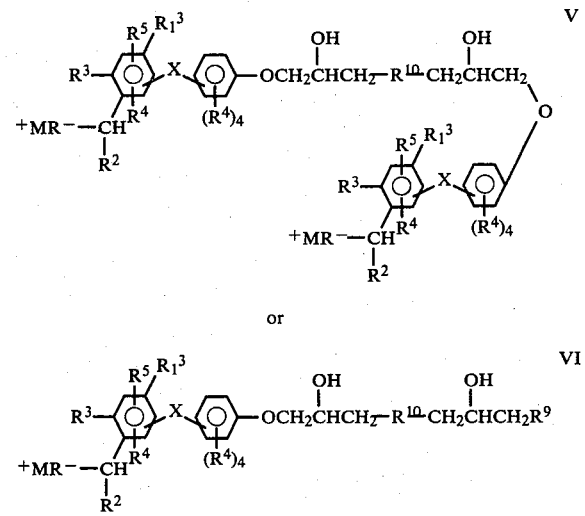

where $R^-$, $R^2$, $R^3$, $R_1{}^3$, $R^4$, $R^5$, $R^9$, X, and $M^+$ are as hereinbefore defined and $R^{10}$ represents the residue of an aliphatic, cycloaliphatic, or aromatic diglycidyl ether or ester after removal of both glycidyl groups.

It is further preferred that $R^{10}$ in the compounds of formula V or formula VI is itself of formula

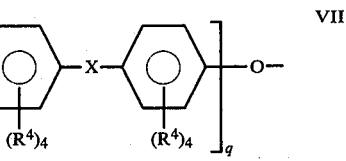

where $R^4$ and X are as hereinbefore defined and q is zero or an integer of from 1 to 20, and is preferably from 2 to 10.

Salts of formula I, V, and VI wherein the group $R^3$ represents a hydroxyl group are particularly preferred, as are those in which $R^2$ and $R^4$ both represent a hydrogen atom.

Another aspect of this invention is a process for the preparation of water-soluble or water-dispersible resinous salts which comprises reaction of a phenol-terminated resin of formula

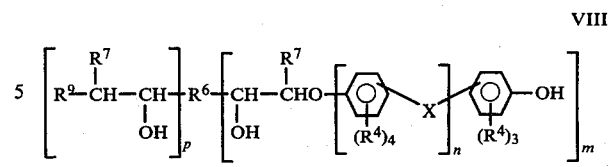

wherein $R^4$, $R^6$, $R^7$, $R^9$, X, m, n, and p are as hereinbefore defined, with the proviso that at least one of the two carbon atoms ortho, or the one carbon atom para, to the carbon atom bearing the indicated phenolic hydroxyl group is unsubstituted, by thioalkylation in the presence of a source of $M^+$ (where $M^+$ is as previously defined) ions with an aldehyde of formula $$R^2CHO \qquad IX$$

where $R^2$ is as hereinbefore defined, and a mercaptocarboxylic acid of formula $$HS-R_1{}^1-COOH \qquad X$$

where $R_1{}^1$ is as hereinbefore defined for $R^1$ but may contain a carboxylic acid (—COOH) substituent instead of a —COO$^-$M$^+$ substituent.

This reaction is preferably effected by heating the reactants, usually in an inert solvent, in the presence of sufficient of a base at least partially to neutralise the mercaptocarboxylic acid. The reaction temperature is preferably within the range 60° to 180° C., especially 75° to 140° C., and the reaction is usually complete within 15 minutes to 8 hours. Suitable inert solvents include hydrocarbons, ethers, alcohols, and esters; amongst these toluene, xylene, tetrahydrofuran, butanols, ethyl acetate, and especially 2-butoxyethanol and 2-ethoxyethanol, are preferred.

A further aspect of this invention is a process for the preparation of water-soluble or water-dispersible resinous salts which comprises reaction of a phenol-terminated resin of formula VIII (where $R^4$, $R^6$, $R^7$, $R^9$, X, m, n, and p are as hereinbefore defined) with an aldehyde of formula IX (wherein $R^2$ is as hereinbefore defined) and sulphurous acid or a water-soluble salt of sulphurous acid, such as sodium or potassium sulphite, bisulphite, or metabisulphite. This reaction is preferably effected by heating the reactants, usually in an inert solvent, if necessary in the presence of sufficient of a base at least partially to neutralise any free acid, and optionally in the presence of a surfactant. The preferred reaction temperatures and suitable solvents are as described above for the reaction with a mercaptocarboxylic acid.

Suitable bases for the at least partial neutralisation include sodium hydroxide, sodium carbonate, potassium carbonate, ammonia, triethylamine, and triethanolamine, 2-(dimethylamino)-2-methylpropan-1-ol and 2-(dimethylamino)ethanol are particularly preferred.

Usually 0.3 to 2.0 moles of the mercaptocarboxylic acid of formula X or of sulphurous acid or its salt are employed per mole of phenolic hydroxyl groups in the resin of formula VIII. An excess of the aldehyde of formula IX is usually employed, especially 1.1 to 4.0 moles of the aldehyde per mole of the mercaptocarboxylic acid of formula X or of sulphurous acid or its salt, since the products then exhibit greater stability to storage at room temperature.

The preferred aldehyde of formula IX is formaldehyde; conveniently this is generated in situ from paraformaldehyde.

Preferred acids of formula X are 2- or 3-mercaptopropionic acid, thioglycolic acid, and thiomalic acid.

The phenol-terminated resins of formula VIII used as starting materials are themselves prepared by the reaction of a polyepoxide, preferably a diepoxide, with an excess of a dihydric phenol using known methods. This reaction results in advancement of the polyepoxide through reaction with both hydroxyl groups of the dihydric phenol. There must be at least as much dihydric phenol present as there is polyepoxide, on a molar basis, in order to give a product having at least one terminal phenolic group. The molar ratio of polyepoxide to dihydric phenol is usually within the range 1:1.02 to 1:1.6, and especially 1:1.1 to 1:1.5. The preferred method of advancement is by heating the reactants at 100°–200° C., and in the presence of a base, which may be a tertiary amine but is preferably an alkali metal hydroxide. An inert solvent may be present if desired.

The dihydric phenol used for advancement may be mononuclear, e.g., hydroquinone, but is preferably a bisphenol, especially one of formula

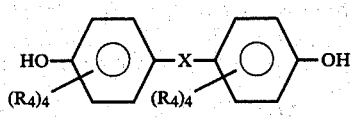 XI where X and $R^4$ are as hereinbefore defined, such as bis(4-hydroxyphenyl)methane and 2,2-bis(4-hydroxyphenyl)propane.

Polyepoxides preferred for advancement to form the starting material of formula VIII are those containing two terminal groups of formula

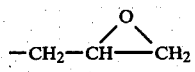 XII directly attached to an atom or atoms of oxygen, nitrogen, or sulphur.

As examples of such resins may be mentioned polyglycidyl esters obtainable by reaction of a compound containing two carboxylic acid groups per molecule with epichlorohydrin or glycerol dichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, and dimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids, such as phthalic acid, isophthalic acid, and terephthalic acid.

Further examples are polyglycidyl ethers obtainable by reaction of a compound containing at least two free alcoholic hydroxyl or phenolic hydroxyl groups per molecule with epichlorohydrin or glycerol dichlorohydrin under alkaline conditions or, alternatively, in the presence of an acid catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 2,2-bis(4-hydroxyphenyl)propane, 2,2-bis(3,5-dibromo-4-hydroxyphenyl)propane and 2,2-bis(2-allyl-4-hydroxyphenyl)propane.

Poly(N-glycidyl) compounds include, for example, those obtained by dehydrochlorination of the reaction products of epichlorohydrin with amines containing two amino-hydrogen atoms such as aniline, n-butylamine, and bis(4-methylaminophenyl)methane; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Polyepoxides having the 1,2-epoxide groups attached to different kinds of hetero atoms may be employed, e.g., the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Polyepoxides containing non-terminal epoxide groups may also be employed, such as vinylcyclohexene dioxide, limonene dioxide, dicyclopentadiene oxide, 4-oxatetracyclo[6,2,1,0$^{2,7}$,0$^{3,5}$]-undec-9-yl glycidyl ether, the bis(4-oxatetracyclo[6,2,1,0$^{2,7}$,0$^{3,5}$]-undec-9-yl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, and 3-(3,4-epoxycyclohexyl)-8,9-epoxy-2,4-dioxaspiro[5,5]undecane.

Also, if desired, a mixture of diepoxides may be used. Polyepoxides containing more than two epoxide groups may be advanced but, as those skilled in the art of epoxide resins are aware, advancement of such polyepoxides is more difficult, there being a risk of gelation.

Preferred diepoxides are diglycidyl ethers and diglycidyl esters. Specific preferred diepoxides are diglycidyl ethers of 2,2-bis(4-hydroxyphenyl)propane or bis(4-hydroxyphenyl)methane, having a 1,2-epoxide content of more than 1.0 equivalent per kilogram.

The dihydric phenol may be used alone or, if desired, in the presence of a compound which reacts with an epoxide group of the polyepoxide but will not react further, so preventing further chain-lengthening reaction. Suitable such 'chain-terminators' are secondary monoamines, monocarboxylic acids and, more especially, monohydric phenols, p-tert.butylphenol being particularly preferred. If a chain terminator is added it must be in such a quantity that at least one epoxide group per average molecule of the polyepoxide is left free to react with the dihydric phenol.

As already stated, the salts of this invention may be used, in the form of heat-curable compositions, to form surface coatings.

This invention accordingly further provides heat-curable compositions comprising 100 parts by weight of a salt of formula I, calculated on its solids content (as hereinafter defined) and 2 to 200 parts, preferably 25 to 150 parts, by weight, calculated on its solids content, of an aminoplast, a phenol-formaldehyde resin, or a blocked polyisocyanate, the aminoplast or phenolformaldehyde resin having at least 2 groups of formula

  XIII attached directly to an amidic nitrogen atom or atoms or directly attached to carbon atoms of a phenolic ring, where $R^{11}$ represents a hydrogen atom or an alkyl group of from 1 to 6 carbon atoms.

Such compositions in a form suitable for application will usually also contain water and a minor proportion, compared with the volume of water, of an organic solvent, such as an ether, alcohol, ketone, or ester, especially 2-butoxyethanol or 2-ethoxyethanol. Methylolated compounds which may be used to form the compositions include urea-formaldehyde condensates, aminotriazine-formaldehyde condensates, especially melamine-formaldehyde and benzoguanamine-formaldehyde condensates, and phenol-formaldehyde condensates. These may be etherified if desired, e.g., the n-butyl ethers may be used. In many cases the methylolated compounds and their ethers are not themselves water-soluble or water-dispersible. Incorporation of a compound of formula I aids the dispersion or solution of such materials in water, giving stable solutions or dispersions of the mixtures.

Examples of suitable blocked polyisocyanates (i.e., those which are stable in the aqueous dispersion at room temperature but which react with the compound of formula I on heating) include di- and poly-isocyanates blocked with caprolactam, an oxime (e.g., cyclohexanone oxime), a monohydric phenol (e.g., phenol itself, p-cresol, and p-tert.butylphenol), or a monohydric aliphatic, cycloaliphatic, or araliphatic alcohol (e.g., methanol, n-butanol, decanol, 1-phenylethanol, 2-ethoxyethanol, and 2-n-butoxyethanol). Suitable isocyanates include aromatic di-isocyanates such as m-phenylene, 1,4-naphthylene, 2,4- and 2,6-tolylene, and 4,4'-methylenebis(phenylene) di-isocyanates, and also their prepolymers with glycols (e.g., ethylene and propylene glycol), glycerol, trimethylolpropane, pentaerythritol, diethylene glycol, and adducts of alkylene oxides with these aliphatic di- and polyhydric alcohols.

The compositions may be cured by heating at 100° C. to 275° C., preferably 150° C. to 225° C., for from 30 seconds to 1 hour, preferably from 2 to 30 minutes.

Other water-soluble or water-dispersible film-forming substances may also be included, such as alkyd resins and acrylic resins. The amount of such materials may vary between wide limits, but should not be so great as to mask the advantageous properties of the compositions of this invention. Typically, additions of up to 50%, and preferably not more than 30% may be used, these percentages being based on the solids content of the materials.

By the term "solids content", as used throughout the present specification and the claims thereto, is meant the percentage residue left after a 1 g sample of the material has been heated in a 5 cm diameter open dish in an oven at 120° C. for 3 hours at atmospheric pressure.

We have further found that if, in formula I, $R^5$ denotes a group of formula $—CH(R^2)OH$, the salts may be heat-cured without including an aminoplast, a phenol-formaldehyde resin, or a blocked polyisocyanate.

A further aspect of this invention accordingly provides a method of coating a surface which comprises applying thereto a salt of formula I wherein $R^5$ denotes a group of formula $—CH(R^2)OH$ and heating the coated surface to a temperature within the range 100° C. to 275° C., preferably 150° C. to 225° C., for from 30 seconds to 1 hour and preferably for from 2 to 30 minutes, to cure the salt.

Surfaces to be coated with a composition of this invention are preferably of primed or unprimed metal, especially a ferrous metal, but may be, e.g., of wood or a heat-resistant synthetic material.

The compositions may be applied by immersion, brushing, rollering, spraying (including electrostatic spraying), by electrodeposition, or by any other conventional means. They may, if desired, include pigments and dyes. Other materials which may be incorporated include extenders such as calcium carbonate, calcium sulphate, barium sulphate, and magnesium silicate, surface-active agents, flow additives, and plasticisers. They may also contain a strong acid, e.g., an aromatic sulphonic acid or its salt with an amine or ammonia, as catalyst.

This invention is illustrated by the following Examples in which all percentages are by weight.

Starting materials used in the Examples were prepared as follows:

PHENOL I

Epoxide resin I, i.e., a liquid glycidyl polyether of 2,2-bis(4-hydroxyphenyl)propane, (760 g; epoxide group content 5.25 equiv./kg), 2,2-bis(4-hydroxyphenyl)propane (684 g), and 10% aqueous sodium hydroxide solution (1.6 g) were stirred and heated under nitrogen to 160° C. The molar ratio of epoxide resin to bisphenol was 1:1.5. An exothermic reaction commenced and the temperature of the mixture rose spontaneously to 197° C. The mixture was cooled to 180° C. and stirred at this temperature for a further 3 hours to give Phenol I, a phenolic hydroxyl group-terminated resin having negligible epoxide group content (not more than 0.02 equiv./kg) and an average molecular weight of 1370.

PHENOL II

Epoxide resin I (35.9 kg), 2,2-bis(4-hydroxyphenyl)propane (24.6 kg), p-tert.butylphenol (2.0 kg), and 10% aqueous sodium hydroxide solution (39 g) were stirred and heated under nitrogen to 180° C. The molar ratio of epoxide resin to bisphenol to monohydric phenol was 1:1.14:0.14. An exothermic reaction commenced and the temperature of the mixture rose spontaneously to 207° C. The mixture was cooled to 180° C. and stirred at this temperature for 3½ hours to give Phenol II, a phenolic hydroxyl group-terminated resin having a negligible epoxide group content and an average molecular weight of 1880.

PHENOL III 3,4-Epoxycyclohexylmethyl 3',4'-epoxycyclohexanecarboxylate (200 g; epoxide group content 7.00 equiv./kg), 2,2-bis(4-hydroxyphenyl)propane (199.5 g), and 50% aqueous tetramethylammonium chloride (2.4 g) were stirred and heated to 120° C. The molar ratio of the epoxide resin to bisphenol was 1:1.25. An exothermic reaction commenced and the temperature of the mixture rose spontaneously to 132° C. The mixture was cooled to 120° C. and stirred at this temperature for a further 2 hours followed by 3 hours at 160° C. to give Phenol III, a phenolic hydroxyl group-terminated resin having a negligible epoxide group content (0.08 equiv./kg) and an average molecular weight of 1220.

PHENOL IV

Epoxide resin I (114.3 g), hydroquinone (44 g), and 50% aqueous tetramethylammonium chloride (1 g) were stirred and heated to 130° C. The molar ratio of Epoxide resin I to hydroquinone was 1:1.33. An exothermic reaction commenced and the temperature of the mixture rose spontaneously to 190° C. The mixture was cooled to 160° C. and stirred at this temperature for 3½ hours to give Phenol IV, a phenolic hydroxyl group-terminated resin having a negligible epoxide group content (not more than 0.02 equiv./kg) and an average molecular weight of 1520.

PHENOL V

Epoxide resin I (256.0 g), 2,2-bis(4-hydroxyphenyl) sulphone (254.0 g), and 50% aqueous tetramethylammonium chloride (3.3 g) were stirred and heated to 120° C. The molar ratio of Epoxide resin I to the bisphenol was 1:1.5. An exothermic reaction commenced and the temperature of the mixture rose spontaneously to 170° C. The mixture was heated further to 180° C. and held at this temperature for 2¼ hours to give Phenol V, a phenolic hydroxyl group-terminated resin having a negligible epoxide group content (not more than 0.02 equiv./kg) and an average molecular weight of 1400.

PHENOL VI

Epoxide resin II, i.e., a solid glycidyl polyether of 2,2-bis(4-hydroxyphenyl)propane (100 g; epoxide group content 1.40 equiv./kg), 2-butoxyethanol (70 g), and acetic acid (2.1 g; 0.035 mol.) were stirred and heated to 120° C. and maintained at 120° C. for 4 hours by which time the epoxide group content had fallen to 0.58 equiv./kg. There were added 2,2-bis(4-hydroxyphenyl)-propane (24 g) and 10% aqueous sodium hydroxide solution (0.2 g), and the mixture was heated under nitrogen to 170° C. and maintained at 170° C. for 6 hours to give a solution in 2-butoxyethanol of Phenol VI, a phenolic hydroxyl group-terminated resin having a negligible epoxide group content.

AMINOPLAST I

This is a water-soluble, methylated hexamethylolmelamine resin of 100% solids content which contains, on average, 4.0 methoxymethyl residues per aminotriazine nucleus, and has a viscosity of 10 Pa s at 25° C.

PHENOPLAST I

This is a commercially available butylated phenol-formaldehyde resin, supplied as a solution (56% solids content) in n-butanol containing a small amount of toluene. It is not soluble nor dispersible in water.

BLOCKED ISOCYANATE I

A mixture (43.9 g, 0.25 mol) of 2,4- and 2,6-diisocyanatotoluene (ratio 4:1) was stirred in a reactor and 2-ethylhexanol (71.5 g, 0.55 mol.) containing 2 drops of dibutyltin dilaurate catalyst was added slowly, maintaining the reaction temperature below 60° C.

Free formaldehyde was determined by the following method:

About 1.5 g of the resin was weighed accurately and placed in a conical flask. Distilled water (30 ml) was added and the contents were mixed thoroughly. Thymolphthalein indicator (3 drops) was added and the mixture was adjusted to neutrality with N/10 hydrochloric acid or sodium hydroxide if necessary. The mixture was cooled in ice, and ice-cold sodium sulphite solution (25 ml, 12.5% w/w) was added. The mixture was shaken vigorously and then titrated against N/10 hydrochloric acid until the blue colour disappeared. The percentage free formaldehyde=

(titre (ml) × normality of HCl × 3.001)/sample weight (g)

EXAMPLE 1

A solution of Phenol I (50.0 g; 0.036 mole) in 2-butoxyethanol (16.7 g) was mixed with thioglycolic acid (9.2 g; 0.10 mole) and heated to 100° C. After 30 minutes at 100° C., the mixture was cooled to 80° C. and paraformaldehyde (3.6 g; 91% active content, 0.11 mole) and 2-(dimethylamino)ethanol (5.3 g; 0.060 mole) were added. This solution was then gently heated to reflux at 140° C. and maintained at reflux for 8 hours by which time the measured free formaldehyde content had fallen to 0.22%. The product had a solids content of 73.7% and was fully dilutable with water.

The product is substantially of average formula I, where $R^-$ denotes a group of formula II, $R^1$ denotes $-CH_2-$, $R^2$, $R^3{}_1$, $R^4$, and $R^7$ each denote $-H$, $R^3$ denotes $-OH$, some of $R^5$ denote $-H$ and the remainder denote a group $-CH_2-S-CH_2COO^-M^+$ ortho to $R^3$, $R^6$ denotes a residue comprising units of formula

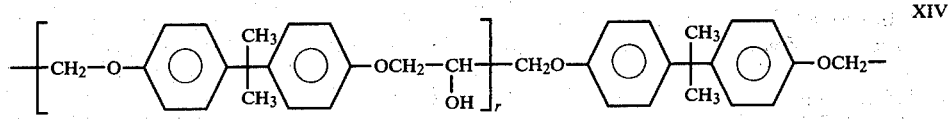

XIV wherein r has an average value 2.3, m is 2, p is zero, n is 1, X denotes isopropylidene para to $R^3$, and 60% of the groups $M^+$ denote a group of formula $HOCH_2CH_2N^+H(CH_3)_2$, the remainder denoting $H^+$.

EXAMPLE 2

A solution of Phenol II (350 g; 0.186 mole) in 2-butoxyethanol (191 g) was mixed with thioglycolic acid (47.9 g; 0.52 mole) and heated to 100° C. After 30 minutes at 100° C. the mixture was cooled to 80° C. and paraformaldehyde (20.6 g; 91% active content, 0.62 mole) and 2-(dimethylamino)ethanol (46.2 g; 0.52 mole) were added. This solution was then gently heated to reflux at 130° C. and maintained at reflux for 5 hours by which time the measured free formaldehyde content had fallen to 0.6%. The product had a solids content of 63.5% and was fully dilutable with water.

The product is substantially of average formula I, where $R^-$ denotes a group of formula II, $R^1$ denotes —$CH_2$—, $R^2$, $R^3_1$, $R^4$, and $R^7$ each denote —H, $R^3$ denotes —OH, some of $R^5$ denote —H and the remainder denote a group —$CH_2$—S—$CH_2COO^-M^+$ ortho to $R^3$, $R^6$ denotes a residue comprising units of formula XIV wherein r is of average value 4.0, (m+p) is 2, n is 1, $R^9$ denotes p-tert.-butylphenoxy, X denotes isopropylidene para to $R^3$, and $M^+$ denotes a group of formula $HOCH_2CH_2N^+H(CH_3)_2$.

EXAMPLE 3

A solution of Phenol I (50.0 g; 0.036 mole) in 2-butoxyethanol (16.7 g) was mixed with thiomalic acid (15.0 g; 0.10 mole) and heated to 120° C. After 30 minutes at 120° C., the mixture was cooled to 80° C. and paraformaldehyde (10 g; 91% active content, 0.30 mole) and 2-(dimethylamino)ethanol (18.0 g; 0.20 mole) were added. This solution was then gently heated to reflux at 138° C. and maintained at reflux for 6 hours by which time the measured free formaldehyde had fallen to 0.9%. The product had a solids content of 67.5% and was fully dilutable with water.

The product is substantially of average formula I, where $R^-$ denotes a group of formula II, $R^1$ denotes —$CH_2$—, $R^2$, $R^3_1$, $R^4$, and $R^7$ each denote —H, $R^3$ denotes —OH, some of $R^5$ denote —H and the remainder denote a group —$CH_2OH$ or

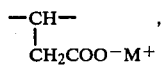

$R^2$, $R^3_1$, $R^4$, and $R^7$ each denote —H, $R^3$ denotes —OH, some of $R^5$ denote —H and the remainder denote a group —$CH_2OH$ or

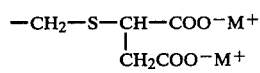

ortho to $R^3$, $R^6$ denotes a residue comprising units of formula XIV wherein r is of average value 2.3, m is 2, p is zero, n is 1, X denotes isopropylidene para to $R^3$, and $M^+$ denotes a group of formula $HOCH_2CH_2N^+H(CH_3)_2$.

EXAMPLE 4

A solution of Phenol I (50.0 g; 0.036 mole) in 2-butoxyethanol (25 g) was mixed with 3-mercaptopropionic acid (15.9 g; 0.15 mole) and heated to 80° C. To this solution was added paraformaldehyde (7.2 g; 91% active content, 0.22 mole) and 2-(dimethylamino)ethanol (13.3 g; 0.15 mole) and the mixture was gently heated to reflux at 125° C. and maintained at reflux for 5 hours by which time the measured free formaldehyde had fallen to 1.3%. The product had a solids content of 65.1% and was fully dilutable with water.

The product is substantially of average formula I, where $R^-$ denotes a group of formula II, $R^1$ denotes —$CH_2CH_2$—, $R^2$, $R^3_1$, $R^4$, and $R^7$ each denote —H, $R^3$ denotes —OH, some of $R^5$ denote a group —$CH_2OH$ and the remainder denote a group —$CH_2$—S—$CH_2$—$CH_2COO^-M^+$ ortho to $R^3$, $R^6$ denotes a residue comprising units of formula XIV wherein r is of average value 2.3, m is 2, p is zero, n is 1, X denotes isopropylidene para to $R^3$, and $M^+$ denotes a group of formula $HOCH_2CH_2N^+H(CH_3)_2$.

EXAMPLE 5

Phenol III (50 g; 0.041 mole) was mixed with 2-butoxyethanol (20 g) and heated to 110° C. When the phenol had completely dissolved the mixture was cooled to 80° C. and thioglycolic acid (9.2 g; 0.10 mole), 2-(dimethylamino)ethanol (8.9 g; 0.10 mole), and 91% paraformaldehyde (4 g; 0.12 mole) were added. The mixture was gently heated to reflux at 133° C. and maintained at this temperature for 2 hours by which time the measured free formaldehyde content had fallen to 0.9%. The product had a solids content of 68.6% and was fully dilutable with water.

The product is substantially of average formula I, where $R^-$ denotes a group of formula II, $R^1$ denotes —$CH_2$—, $R^2$, $R^3_1$, and $R^4$ denote —H, $R^3$ denotes —OH, some of $R^5$ denote —H and the remainder denote a group —$CH_2SCH_2COO^-M^+$ or —$CH_2OH$ ortho to $R^3$, $R^7$ represents a covalent bond with $R^6$ which, together with the indicated hydroxyethylene group, represents a group of formula

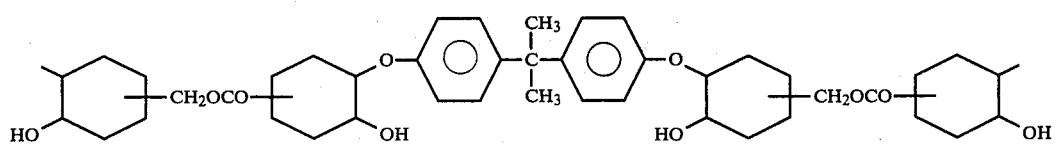

(in which every terminal bond of the indicated groups —$CH_2OCO$— is positioned 3- or 4- to the indicated hydroxyl groups), m is 2, p is zero, n is 1, X denotes isopropylidene para to $R^3$, and $M^+$ denotes a group of formula $HOCH_2CH_2N^+H(CH_3)_2$.

EXAMPLE 6

Phenol IV (50 g; 0.033 mole) was mixed with 2-butoxyethanol (25 g) and heated to 120° C. When the phenol had completely dissolved, the mixture was cooled to 80° C. and thioglycolic acid (9.2 g; 0.10 mole), 91% paraformaldehyde (5.0 g; 0.15 mole), and 2-(dimethylamino)ethanol (9.0 g; 0.10 mole) were added. The solution was then gently heated to reflux at 140° C. and maintained at reflux for 4 hours, by which time the measured free formaldehyde content had fallen to 0.44%. The product had a solids content of 64.9% and was fully dilutable with water.

The product is substantially of average formula I, wherein $R^-$ denotes a group of formula II, $R^1$ denotes —$CH_2$—, $R^2$, $R^3_1$, $R^4$, and $R^7$ denote —H, $R^3$ denotes —OH, some of $R^5$ denote —H and the remainder denote a group —$CH_2OH$ or —$CH_2$—S—$CH_2COO^-M^+$ ortho to $R^3$, m is 2, n and p are zero, $R^6$ denotes a residue containing 2,2-bis(4-oxyphenyl)propane groups, —$CH_2CH(OH)CH_2$— groups, and p-phenylenedioxy groups, and M+ denotes a group of formula $HOCH_2CH_2N^+(CH_3)_2$.

EXAMPLE 7

Phenol V (50 g; 0.036 mole) was mixed with 2-butoxyethanol (20 g) and heated to 140° C. When the phenol had completely dissolved the mixture was cooled to 90° C. and thioglycolic acid (9.2 g; 0.10 mole), 91% paraformaldehyde (4.0 g; 0.12 mole), and 2-(dimethylamino)ethanol (8.9 g; 0.10 mole) were added. The solution was then heated to reflux at 140° C. and maintained at reflux for 4 hours by which time the free formaldehyde content had fallen to 0.40%. The product had a solids content of 68.6% and was fully dilutable with water.

The product is substantially of average formula I, where $R^-$ denotes a group of formula II, $R^1$ denotes $-CH_2-$, $R^2$, $R^3{}_1$, $R^4$, and $R^7$ each denote $-H$, $R^3$ denotes $-OH$, some of $R^5$ denote $-H$ and the remainder denote a group $-CH_2OH$ or $-CH_2-S-CH_2COO^-M^+$ ortho to $R^3$, $R^6$ denotes a residue containing 2,2-bis(4-oxyphenyl)propane groups, $-CH_2CH(OH)CH_2-$ groups, and 2,2-bis(4-oxyphenyl) sulphone groups, m is 2, p is zero, n is 1, X denotes $-SO_2-$ para to $R^3$, and M+ denotes a group of formula $HOCH_2CH_2N^+H(CH_3)_2$.

EXAMPLE 8

Sodium sulphite (7.3 g; 0.58 mole) was dissolved in water (20 ml) and 38.1% formaldehyde solution (10.5 g; 0.120 mole of $CH_2O$) was added. The mixture was stirred at room temperature for one hour and then added to a solution of Phenol I (25 g; 0.018 mole) in 2-butoxyethanol (36.3 g) held at 100° C. Dioctyl succinate sulphonic acid sodium salt (3 g) was added to the mixture, which was heated to reflux (103° C.) and held at reflux for 2 hours. The product had a solids content of 34% and was fully dilutable with water.

The product is substantially of average formula I, where $R^-$ denotes a group of formula III, $R^2$, $R^3{}_1$, $R^4$, and $R^7$ denote $-H$, $R^3$ denotes $-OH$, some of $R^5$ denote $-H$ and the remainder denote $-CH_2OH$ ortho to to $R^3$, $R^6$ denotes a residue comprising units of formula XIV wherein r has an average value of 2.3, p is zero, m is 2, n is 1, X denotes isopropylidene para to $R^3$, and M+ denotes Na+.

EXAMPLE 9

The solution (50 g) of Phenol VI was mixed with thioglycolic acid (4.2 g; 0.046 mol) and 2-(dimethylamino)ethanol (4.1 g; 0.046 mol) and heated to 100° C. When the mixture reached 100° C., paraformaldehyde (3.0 g; 91% active content, 0.09 mol) was added and heating was continued to a temperature of 140° C. The mixture was maintained at 140° C. for 3 hours, by which time the measured free formaldehyde content had fallen to 0.5%. The product had a solids content of 64.8% and was fully dilutable with water.

The product is substantially of average formula I, where $R^-$ denotes a group of formula II, $R^1$ denotes $-CH_2-$, $R^2$, $R^3{}_1$, $R^4$, and $R^7$ each denote $-H$, $R^3$ denotes $-OH$, some of $R^5$ denote $-H$ and the remainder denote a group of formula $-CH_2-S-CH_2COO^-M^+$ ortho to $R^3$, $R^6$ denotes a residue comprising units of formula XIV wherein r is of average value of 3.9, (m+p) is 2, n is 1, $R^9$ denotes $CH_3COO-$, X denotes isopropylidene para to $R^3$, and M+ denotes a group of formula $HOCH_2CH_2N^+H(CH_3)_2$.

EXAMPLE 10

A solution of Phenol I (64.4 g; 0.046 mol) in 2-butoxyethanol (21.5 g) was mixed with thioglycolic acid (5.5 g; 0.06 mol) and heated to 100° C. After 30 minutes at 100° C. the mixture was cooled to 80° C. and paraformaldehyde (4 g; 91% active content, 0.12 mol) and 2-(dimethylamino)ethanol (5.3 g; 0.64 mol) were added. This solution was then gently heated to reflux at 140° C. and maintained at reflux for 4 hours by which time the measured free formaldehyde content had fallen to 0.20%. The product had a solids content of 74.0% and was fully dilutable with water.

The product is substantially of average formula I, where $R^-$ denotes a group of formula II, $R^1$ denotes $-CH_2-$, $R^2$, $R^3{}_1$, $R^4$, and $R^7$ each denote $-H$, $R^3$ denotes $-OH$, some of $R^5$ denote $-CH_2OH$ and the remainder denote a group of formula $-CH_2-S-CH_2COO^-M^+$ ortho to $R^3$, $R^6$ denotes a residue comprising units of formula XIV wherein r has an average value of 2.3, m is 2, p is zero, n is 1, X denotes isopropylidene para to $R^3$, and M+ denotes a group of formula $HOCH_2CH_2N^+H(CH_3)_2$.

EXAMPLES 11–13

In these Examples carboxylate salts of this invention are cured by heating with an aminoplast.

Coating formulations were prepared by mixing the products of, respectively, Examples 1, 2, and 4 with Aminoplast I in the ratio 80:20 calculated on the solids contents. The resulting solutions were diluted with water and applied to tin-coated steel plates by spin-coating, leaving a coating 2 μm thick. The plates were then heated at 215° C. for 3 minutes and tested. The results are shown in Table 1.

EXAMPLE 14

In this Example a carboxylate salt of this invention is cured by heating with a phenolic resin.

A coating formulation was prepared by mixing the product of Example 2 with Phenoplast I in the ratio 72:25, calculated on the solids contents. The resulting solution was diluted with water and applied to tin-coated steel plates by spin-coating, leaving a coating 2–4 μm thick. The plates were then heated at 200° C. for 10 minutes and tested. The results are also shown in Table 1.

TABLE 1

| Test | Example 11 | Example 12 | Example 13 | Example 14 |
|---|---|---|---|---|
| EMK rub[1] | Pass | Pass | Pass | Pass |
| Wedge bend[2] pass at | 55% | 80% | 55% | 88% |
| Pasteurisation in water 75° C./45 min.[3] | Pass | Pass | Pass | — |
| Water boil 100° C./1 hour[3] | Fail | Pass | Softened | — |
| 3% acetic acid 100° C./6 hours[3] | — | — | — | Pass |

A dash (—) indicates that the test was not carried out
[1] The EMK rub test comprised giving the coated surface 50 double rubs with cotton wool soaked in ethyl methyl ketone and examining the surface for removal or softening. 'Pass' indicates that no effect was observed
[2] The wedge bend test comprised impact-bending the specimens over a mandrel 10 cm long, having an outside diameter of 6 mm at one end and tapering to a point at the other. The specimens were then examined to determine the percentage of the length of the sample from which the coating did not flake off.
[3] The pasteurisation and boiling tests comprised heating the samples in water or acetic acid for the given time and temperature and examining the coated surface for any defects. 'Pass' indicated that no defects were observed.

EXAMPLE 15

In this Example a carboxylate salt of this invention is cured by heating alone, i.e., in the absence of an aminoplast or phenoplast.

The product of Example 10 was diluted with water as required to give a viscosity at 25° C. of 20–30 mPa s and applied to tin-coated steel plates by spin coating leaving a coating 2 to 4 μm thick. The coating was cured by heating at 215° C. for 10 minutes. The coating passed the EMK rub test and pasteurisation in water test described above.

EXAMPLE 16

In this Example a carboxylate salt of this invention is cured by heating with a blocked isocyanate.

A formulation for coatings comprising the product of Example I (10 g), Blocked Isocyanate I (1.8 g), and water as required to give a viscosity at 25° C. of 20–30 mPa s was applied to tin-coated steel plates by spin-coating, leaving a coating 2 to 4 μm thick. The plates were heated at 180° C. for 20 minutes. The coating passed the EMK rub test and pasteurisation in water test as described above.

What is claimed is:

1. Salts of formula

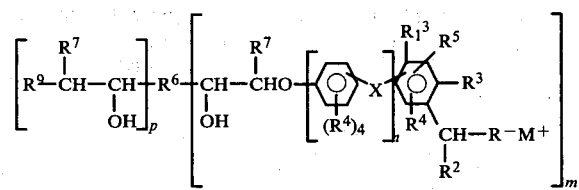

where $R^-$ represents either a group of formula

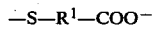   II or a group of formula

   III wherein $R^1$ represents an aliphatic, aromatic, or araliphatic divalent group of 1 to 10 carbon atoms, $R^2$ represents a hydrogen atom or an alkyl group of 1 to 4 carbon atoms, one of $R^3$ and $R_1{}^3$ represents a hydroxyl group and the other represents a hydrogen atom, a halogen atom, an alkyl group of 1 to 4 carbon atoms, or an alkenyl group of 2 to 4 carbon atoms, each $R^4$ represents a hydrogen atom, a halogen atom, an alkyl group of 1 to 4 carbon atoms, or an alkenyl group of 2 to 4 carbon atoms, $R^5$ represents an atom or a group bonded to a ring carbon atom which is ortho or para to the group $R^3$ or $R_1{}^3$ that represents a hydroxyl group and is a hydrogen atom, a halogen atom, an alkyl group of 1 to 4 carbon atoms, an alkenyl group of 2 to 4 carbon atoms, a group of formula $-CH(R^2)OH$, a group of formula $-CH(R^2)OR^8$, or a group of formula $$-CH-R^-M^+ \quad \text{IV}$$
$$\quad | \quad$$
$$\quad R^2$$

wherein $R^8$ represents either an alkyl group of from 1 to 6 carbon atoms or an alkoxyalkyl group wherein the alkoxy group and the alkyl group each have from 1 to 6 carbon atoms, $R^6$ represents the residue of a polyepoxide after removal of (m+p) 1,2-epoxide groups, each $R^7$ represents either a hydrogen atom or a covalent bond which is linked to the group $R^6$ to form a cycloaliphatic ring, $R^9$ represents the residue of a monohydric phenol, a secondary monoamine, or a monocarboxylic acid after removal therefrom of the hydrogen atom of the phenolic hydroxyl group, the secondary amino group, or the carboxylic acid group, m represents 1, 2, 3, or 4, n represents zero or 1, p represents zero or 1, such that (m+p) is at least 2 and at most 4, X represents an alkylene or alkylidene group of 1 to 3 carbon atoms, a carbonyl or sulfonyl group, an oxygen or sulfur atom, or a valence bond, and $M^+$ represents a hydrogen ion, a cation derived from an alkali metal, ammonia, or an amine, or one valence of a polyvalent cation, with the proviso that at least 25% of the ions $M^+$ are a said cation.

2. A salt as claimed in claim 1, wherein $R^6$ in formula I represents a said residue having an average molecular weight of from 1000 to 5000.

3. A salt as claimed in claim 1, wherein $R^-$ in formula I represents a group of formula II in which $R^1$ represents an alkylene group of 1 or 2 carbon atoms.

4. A salt as claimed in claim 1, which is also of formula

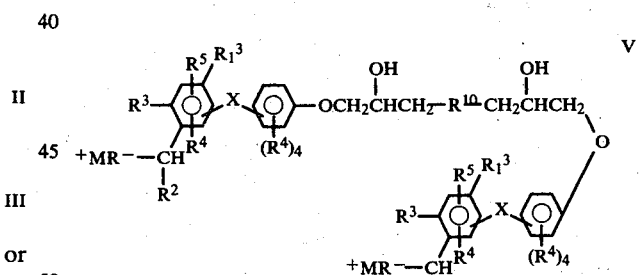

or

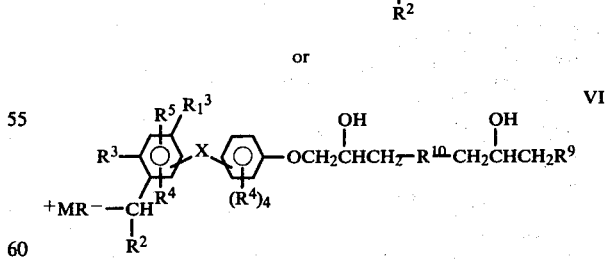

where $R^{10}$ represents the residue of an aliphatic, cycloaliphatic, or aromatic diglycidyl ether or ester after removal of both glycidyl groups.

5. A process for the preparation of resinous salts which are at least dispersible in water, comprising reaction of a phenol-terminated resin of formula

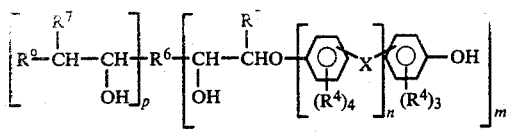

with the proviso that at least one of the two carbon atoms ortho, or the one carbon atom para, to the carbon atom bearing the indicated phenolic hydroxyl group is unsubstituted, in the presence of a source of $M^+$ ions with an aldehyde of formula $$R^2CHO \qquad\qquad IX$$

and a mercaptocarboxylic acid of formula $$HS-R_1{}^1-COOH \qquad\qquad X$$

where
R$^2$ represents a hydrogen atom or an alkyl group of 1 to 4 carbon atoms,
each R$^4$ represents a hydrogen atom, a halogen atom, an alkyl group of 1 to 4 carbon atoms, or an alkenyl group of 2 to 4 carbon atoms,
R$^6$ represents the residue of a polyepoxide after removal of (m+p) 1,2-epoxide groups,
each R$^7$ represents either a hydrogen atom or a covalent bond which is linked to the group R$^6$ to form a cycloaliphatic ring,
R$^9$ represents the residue of a monohydric phenol, a secondary monoamine, or a monocarboxylic acid after removal of the hydrogen atom of the phenolic hydroxyl group, the secondary amino group, or the carboxylic acid group,
m represents 1, 2, 3, or 4,
n represents zero or 1,
p represents zero or 1, such that (m+p) is at least 2 and at most 4,
X represents an alkylene or alkylidene group of 1 to 3 carbon atoms, a carbonyl or sulfonyl group, an oxygen or sulfur atom, or a valence bond,
$M^+$ represents a hydrogen ion, a cation derived from an alkali metal, ammonia, or an amine, or one valence of a polyvalent cation, with the proviso that at least 25% of the ions $M^+$ are a said cation, and
R$_1{}^1$ represents an aliphatic, aromatic, or araliphatic divalent group of 1 to 10 carbon atoms.

6. The process of claim 5, wherein 1.1 to 4.0 moles of the aldehyde of formula IX are used per mole of the mercaptocarboxylic acid of formula X.

7. The process of claim 5, wherein 0.3 to 2.0 moles of the mercaptocarboxylic acid of formula X are used per mole of phenolic hydroxyl groups in the phenol-terminated resin of formula VIII.

8. The process of claim 5, wherein the mercaptocarboxylic acid of formula X is 2-mercaptopropionic acid, 3-mercaptopropionic acid, thioglycolic acid, or thiomalic acid.

9. A process for the preparation of resinous salts which are at least dispersible in water, comprising reaction of a phenol-terminated resin of formula

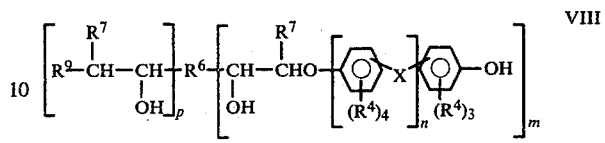

with the proviso that at least one of the two carbon atoms ortho, or the one carbon atom para, to the carbon atom bearing the indicated phenolic hydroxyl group is unsubstituted, in the presence of a source of $M^+$ ions with an aldehyde of formula $$R^2CHO \qquad\qquad IX$$

and sulfurous acid or a water-soluble salt of sulfurous acid, where
R$^2$ represents a hydrogen atom or an alkyl group of 1 to 4 carbon atoms,
each R$^4$ represents a hydrogen atom, a halogen atom, an alkyl group of 1 to 4 carbon atoms, or an alkenyl group of 2 to 4 carbon atoms,
R$^6$ represents the residue of a polyepoxide after removal of (m+p) 1,2-epoxide groups,
each R$^7$ represents either a hydrogen atom or a covalent bond which is linked to the group R$^6$ to form a cycloaliphatic ring,
R$^9$ represents the residue of a monohydric phenol, a secondary monoamine, or a monocarboxylic acid after removal of the hydrogen atom of the phenolic hydroxyl group, the secondary amino group, or the carboxylic acid group,
m represents 1, 2, 3, or 4,
n represents zero or 1,
p represents zero or 1, such that (m+p) is at least 2 and at most 4,
X represents an alkylene or alkylidene group of 1 to 3 carbon atoms, a carbonyl or sulfonyl group, an oxygen or sulfur atom, or a valence bond, and
$M^+$ represents a hydrogen ion, a cation derived from an alkali metal, ammonia, or an amine, or one valence of a polyvalent cation, with the proviso that at least 25% of the ions $M^+$ are a said cation.

10. The process of claim 9, wherein 1.1 to 4.0 moles of the aldehyde of formula IX are used per mole of sulfurous acid or its salt.

11. The process of claim 9, wherein 0.3 to 2.0 moles of sulfurous acid or a water-soluble salt thereof are used per mole of phenolic hydroxyl groups in the phenol-terminated resin of formula VIII.

* * * * *

UNITED STATES PATENT AND TRADEMARK OFFICE
CERTIFICATE OF CORRECTION

PATENT NO. : 4,410,675
DATED : October 18, 1983
INVENTOR(S) : Christopher G. Demmer It is certified that error appears in the above-identified patent and that said Letters Patent are hereby corrected as shown below:

Claims 6, 7, 8, 10, and 11 line 1 The should read -- A --

Signed and Sealed this

Fifth Day of June 1984

[SEAL]

Attest:

GERALD J. MOSSINGHOFF

Attesting Officer

Commissioner of Patents and Trademarks